(12) United States Patent
Prause et al.

(10) Patent No.: US 7,823,975 B2
(45) Date of Patent: Nov. 2, 2010

(54) SUPPORT WITH A BACKREST ADJUSTER DEVICE FOR A MOTOR VEHICLE SEAT

(75) Inventors: Andreas Prause, Coburg (DE); Alwin Macht, Ebensfeld (DE); Markus Fischer, Itzgrund (DE); Klaus Beloch, Michelau (DE); Michael Flieger, Staffelstein (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 320 days.

(21) Appl. No.: 11/921,361

(22) PCT Filed: May 30, 2006

(86) PCT No.: PCT/DE2006/000920
§ 371 (c)(1),
(2), (4) Date: Nov. 30, 2007

(87) PCT Pub. No.: WO2006/128428
PCT Pub. Date: Dec. 7, 2006

(65) Prior Publication Data
US 2009/0236889 A1   Sep. 24, 2009

(30) Foreign Application Priority Data
May 30, 2005 (DE) .................. 10 2005 025 122
May 30, 2005 (DE) .................. 20 2005 008 565 U (51) Int. Cl.
*B60N 2/66* (2006.01)
*A47C 7/46* (2006.01)

(52) U.S. Cl. .................. 297/284.4; 297/284.8

(58) Field of Classification Search ... 297/284.7–284.9, 297/284.4, 284.11
See application file for complete search history.

(56) References Cited

U.S. PATENT DOCUMENTS 4,536,030 A * 8/1985 Sakurada et al. ......... 297/284.9

(Continued)

FOREIGN PATENT DOCUMENTS

DE 10021508 A1 * 11/2001

(Continued)

OTHER PUBLICATIONS

English translation of International Preliminary Examination Report for corresponding PCT application No. PCT/DE2006/000920, dated Dec. 6, 2007.

(Continued)

*Primary Examiner*—David Dunn
*Assistant Examiner*—Tania Abraham
(74) *Attorney, Agent, or Firm*—Christie, Parker & Hale, LLP (57) ABSTRACT

A support with a lumbar adjuster device for a motor vehicle seat includes a front side which, in the installed position, faces a seat user's back and a lumbar adjuster device which is arranged on the front side of the support and is intended for setting the position of the lumbar support perpendicular to the plane of extent of the backrest frame. The lumbar adjuster device has at least one adjuster element to be brought into operative connection with the lumbar support, and at least one slide which is movable with respect to the adjuster element. The slide can be moved, firstly, along a tensioning direction along which it is pretensioned, and, secondly, along a drawing direction along which a drawing force can be transmitted to the slide via a drawing means coupled to the slide.

20 Claims, 11 Drawing Sheets

U.S. PATENT DOCUMENTS

| | | | | |
|---|---|---|---|---|
| 4,678,230 A * | 7/1987 | Winkle | .................... | 297/284.4 |
| 5,088,790 A * | 2/1992 | Wainwright et al. | ..... | 297/284.4 |
| 5,240,308 A * | 8/1993 | Goldstein et al. | ........ | 297/284.3 |
| 5,462,335 A * | 10/1995 | Seyler | ...................... | 297/284.4 |
| 5,823,620 A * | 10/1998 | Le Caz | .................... | 297/284.4 |
| 6,056,360 A | 5/2000 | Schneider | | |
| 7,011,369 B2 * | 3/2006 | Massara et al. | .......... | 297/284.4 |
| 7,537,286 B2 * | 5/2009 | Walker et al. | ............ | 297/284.4 |

FOREIGN PATENT DOCUMENTS

| | | |
|---|---|---|
| DE | 201 00 018 U1 | 2/2002 |
| DE | 203 13 925 U1 | 10/2004 |
| EP | 582821 A1 * | 2/1994 |
| WO | WO 96/33640 | 10/1996 |

OTHER PUBLICATIONS

International Search Report, dated Oct. 25, 2006 for International Patent Application No. PCT/DE2006/000925 based on German priority patent application 10 2005 025 122.6, 10 pages.

International Search Report, dated Oct. 20, 2006, corresponding to PCT/DE2006/000920.

* cited by examiner

SUPPORT WITH A BACKREST ADJUSTER DEVICE FOR A MOTOR VEHICLE SEAT

CROSS-REFERENCE TO A RELATED APPLICATION

This application is a National Phase Patent Application of International Patent Application Number PCT/DE2006/000920, filed on May 30, 2006, which claims priority of German Utility Model Application Number 20 2005 008 565.0, filed on May 30, 2005 and German Patent Application Number 10 2005 025 122.6, filed on May 30, 2005.

BACKGROUND

The invention relates to a support with a lumbar adjuster device for a motor vehicle seat.

A support with a lumbar adjuster device is designed and provided, in an installed position in a backrest frame of a motor vehicle seat, to be arranged with a lumbar support for supporting a seat user's back. A backrest frame of this type has a front side which faces the seat user's back and along which the seat user's spinal column extends in the longitudinal direction of the backrest when the seat is used correctly. A lumbar support for supporting a seat user's back is arranged on the front side of the backrest frame.

On its front side, the support bears a lumbar adjuster device which, in the installed position, serves to set the position of the lumbar support perpendicular to the plane of extent of the backrest frame in order to adjust the curvature of a backrest cushion which is arranged in front of the backrest frame and the lumbar support and via which the vehicle occupant's back is supported on the lumbar support.

A support of this type for a lumbar adjuster device is known from utility model DE 203 13 925. According thereto, the lumbar adjuster device furthermore comprises an adjuster element in operative connection with the lumbar support, and a slide which is movable with respect to the adjuster element by displacement, said adjuster element and slide interacting via a ramp in accordance with the wedge principle in such a manner that, upon a movement of the slide, the adjuster element is adjusted with a component perpendicular to the direction of movement of the slide.

In order to achieve a lumbar adjustment by means of a transverse movement of the slide, an adjuster drive is provided. The adjuster drive has a spindle which is provided both with a right-hand thread and with a left-hand thread in order to be able to adjust the slide in two mutually opposite directions.

SUMMARY

The invention is based on the problem of improving a support with a lumbar adjuster device of the type mentioned at the beginning in respect of the lumbar adjuster mechanism, with, in particular, a more cost-effective manner of adjusting the lumbar support being made possible.

According to the invention the slide of the lumbar adjuster device is pretensioned along a first direction, the tensioning direction. The slide is coupled to a drawing means via which a drawing force can be transmitted to the slide along a second direction, the drawing direction. The slide can be moved both in the drawing direction and in the tensioning direction, with the movement of the slide in one of the two directions bringing about an adjustment of the adjuster element and therefore of the lumbar support.

An expensive adjuster drive with a right-hand thread and at the same time a left-hand thread, as known from the prior art, is therefore redundant: to move the slide in the tensioning direction, a tensioning force acts on the slide, to move it in the drawing direction, a drawing force can act on the slide when a corresponding drive is actuated.

The pretensioning of the slide provides a cost-effective adjustment option.

In an exemplary embodiment, the slide moves in the tensioning direction if the amount of drawing force transmitted to the slide via the drawing means is smaller than the pretensioning of the slide. Conversely, the slide moves in the drawing direction when the amount of drawing force transmitted to the slide via the drawing means is greater than the pretensioning of the slide. If the tensioning force of the pretensioning and the drawing force neutralize each other, the slide does not move and a type of equilibrium of forces arises which can be brought out of the equilibrium simply by controlling the drawing force (i.e. by increasing or lowering the same) and results in a movement of the slide.

The tensioning direction and the drawing direction of the slide preferably point in opposite directions. The resulting direction of movement of the slide: either the tensioning direction, the drawing direction or standstill therefore arises from the vector addition of the tensioning direction and the drawing direction.

In an exemplary embodiment, two slides which are pretensioned in opposite tensioning directions are provided. In this case, two adjuster elements are provided, with the two slides each being movable relative to at least one of the adjuster elements. The use of two slides and two adjuster elements provides a greater possibility of action on the lumbar support. At the same time, the two slides can be moved in opposite drawing directions by a drawing force transmitted to the slides via the drawing means. The drawing direction of the first slide therefore coincides with the tensioning direction of the second slide, and the tensioning direction of the first slide coincides with the drawing direction of the second slide.

In this case, it is preferably provided that the two slides are coupled to each other via a tensioning element. The tensioning element (for example a spring) brings about the pretensioning of the two slides. The coupling via the tensioning element enables the amount of pretensioning on the first slide and the amount of pretensioning on the second slide to be coupled to each other. If a homogenous spring is used as the tensioning element, both pretensionings are equal in amount but point in opposite directions.

In one exemplary embodiment, the transmission of the drawing force to the slide via the drawing means takes place by means of a manual adjustment means which has, for example, a hand wheel. The manual adjustment means enables either the drawing force to be increased, which results in a movement of the slide in the drawing direction, or the drawing force to be reduced, which brings about a movement of the slide in the tensioning direction. By means of the manual adjustment means, the drawing force acting on the slide can advantageously be regulated via the drawing means.

A catch is particularly preferably provided which, in a blocking position, prevents the slide from being moved in the tensioning direction by the pretensioning of the slide. The catch means that it is not necessary to apply a drawing force in order to keep the slide in a fixed position. If the slide is not moved at a particular instant, its movement in the blocking direction is stopped and prevented by the catch. In this case, it is not necessary, in the blocking position, also to block the movement of the slide in the drawing direction, since a movement of the slide in the drawing direction acts counter to the pretensioning. With the catch released and without transmitting a drawing force to the slide via the drawing means, the slide is moved in the tensioning direction by the pretensioning.

In one exemplary embodiment, the pretensioning of the slide is provided by a spring and/or an elastic element. This can be, for example, a helical spring or a rubber band.

As the drawing means, use is preferably made of a cable pull, particularly preferably a Bowden cable. In this case, the casing tube of the Bowden cable is supported on a supporting element on which a tensioning element which brings about the pretensioning of the slide also acts. The pretensioning of the slide and also the casing tube of the Bowden cable, which acts as a means for transmitting the drawing force, therefore acts on the location of the supporting element.

In this exemplary embodiment and when two opposed slides are used, one of the two slides is preferably used as the supporting element on which the casing tube of the Bowden cable is supported. In this case, the cable of the Bowden cable is fastened to the other slide, and therefore, by means of the relative movement of the cable in relation to the casing tube, the drawing force is transmitted to the two slides which are pretensioned counter to each other.

The slide can preferably be moved essentially parallel to the plane of extent of the backrest frame. The wedge movement of the slide toward the adjuster element and the movement of the adjuster element with a component perpendicular to the slide movement bring about the adjustment of the lumbar support perpendicular to the plane of extent of the backrest frame.

In one exemplary embodiment, the slide can be moved essentially rectilinearly. Pretensioning direction and drawing direction therefore remain constant during the movement of the slide and do not have to be deflected.

In one exemplary embodiment, the movement of the slide is guided by means of a slide guide (for example guide rail) which is delimited at least one end by a stop. This prevents the slide from breaking out of the path of movement provided for it.

BRIEF DESCRIPTION OF THE DRAWINGS

The support according to the invention is now explained in more detail with reference to exemplary embodiments which are illustrated in figures, in which.

DETAILED DESCRIPTION

Features which are similar or identical to one another are identified in the figures by the same reference numbers.

An exemplary embodiment of a lumbar support for a backrest of a motor vehicle seat is explained below with reference to FIGS. 1 and 2. The lumbar support is adjusted by actuation of a hand wheel which will be explained below with reference to FIGS. 4, 5A, 5B and 6. FIG. 3 shows the interaction of the manual adjustment means from one of FIGS. 4 to 6 with the lumbar support of FIGS. 1 and 2.

Figure 7:
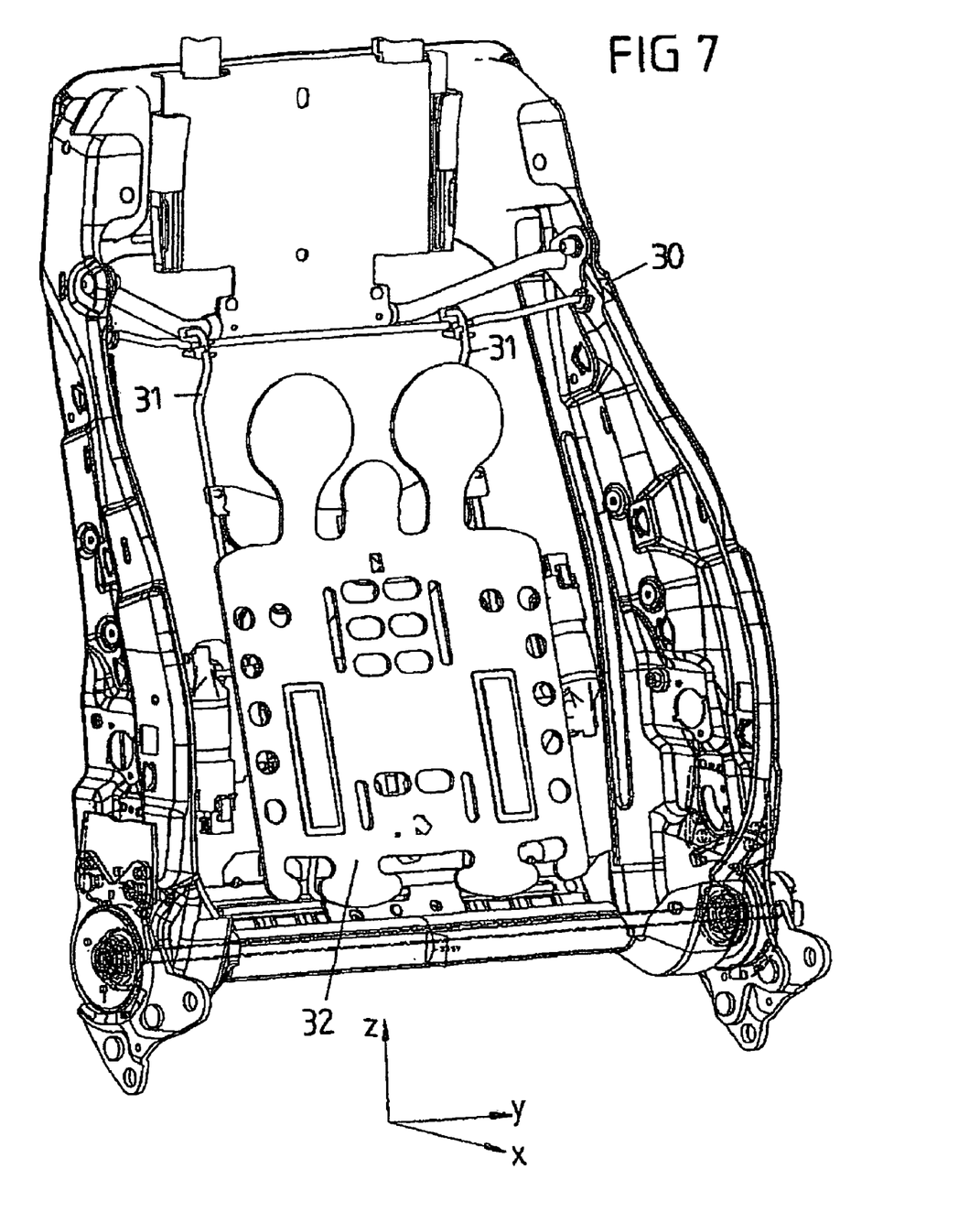
FIG. 7 shows a view of a backrest frame with an adjustable lumbar support in an exploded illustration.

FIG. 7 has a supporting structure of a backrest in the form of a backrest frame 30 and two mutually spaced-apart struts 31 which each extend in the longitudinal direction z of the backrest and in front of which a lumbar support 32 is arranged. The latter is mounted on the backrest frame 30, for example by means of spring elements (not illustrated in the figures).

In the present case, the longitudinal direction z of the backrest is understood as meaning the direction along which the spinal column of a person sitting on a motor vehicle seat extends when the backrest is used correctly on the corresponding vehicle seat. When the backrest is set upright, i.e. when the latter protrudes essentially perpendicularly from the seat cushion, the longitudinal direction z of the backrest runs essentially along the vertical vehicle axis z. The backrest frame 30 and the lumbar support 32 each lie essentially in a plane which is defined by the longitudinal axis z of the backrest and by the horizontal transverse axis y running perpendicularly thereto.

Figure 1:
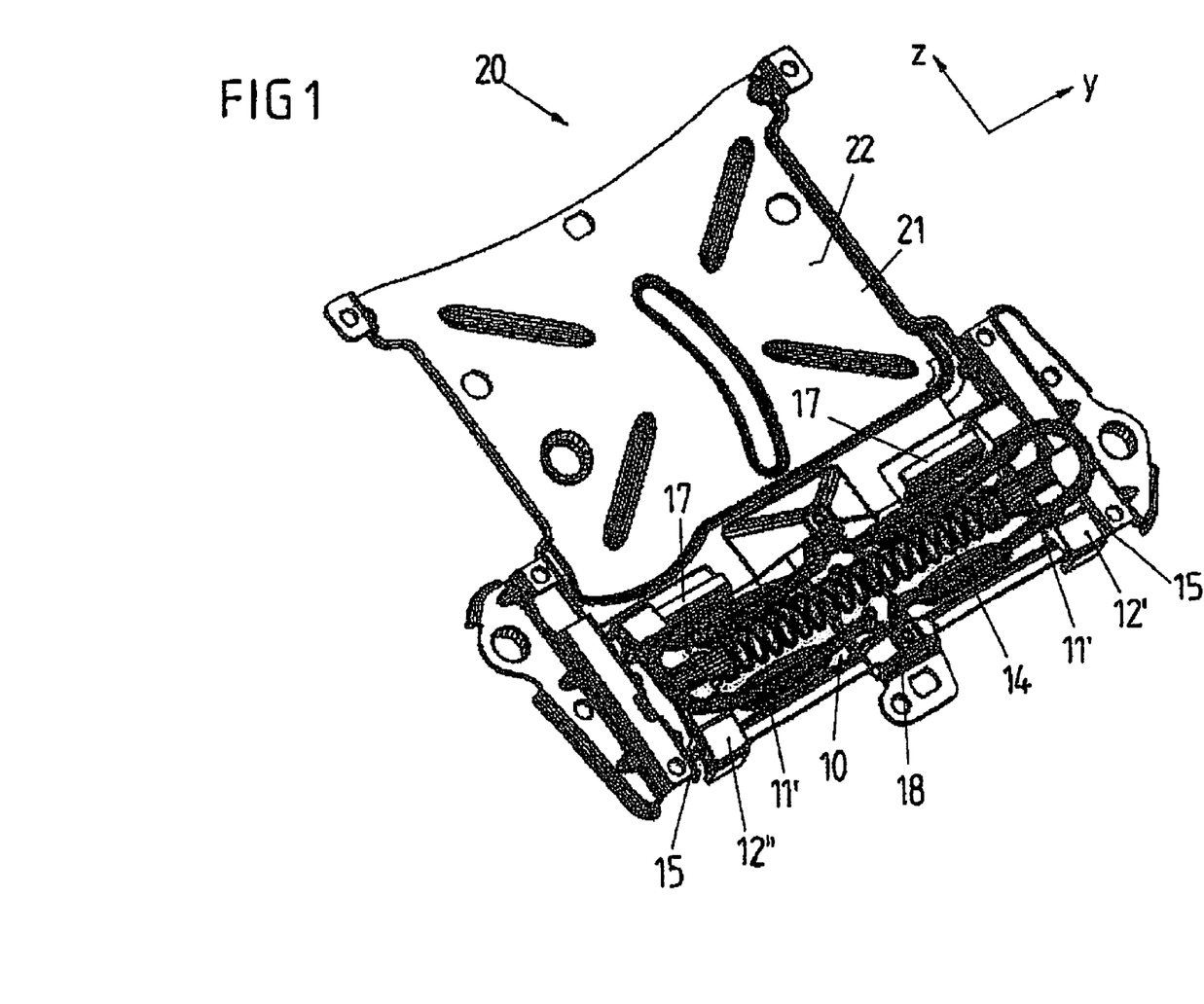
FIG. 1 shows a perspective view of a support with a lumbar adjuster device for setting the position of a lumbar support for a backrest of a motor vehicle seat.
Figure 2:
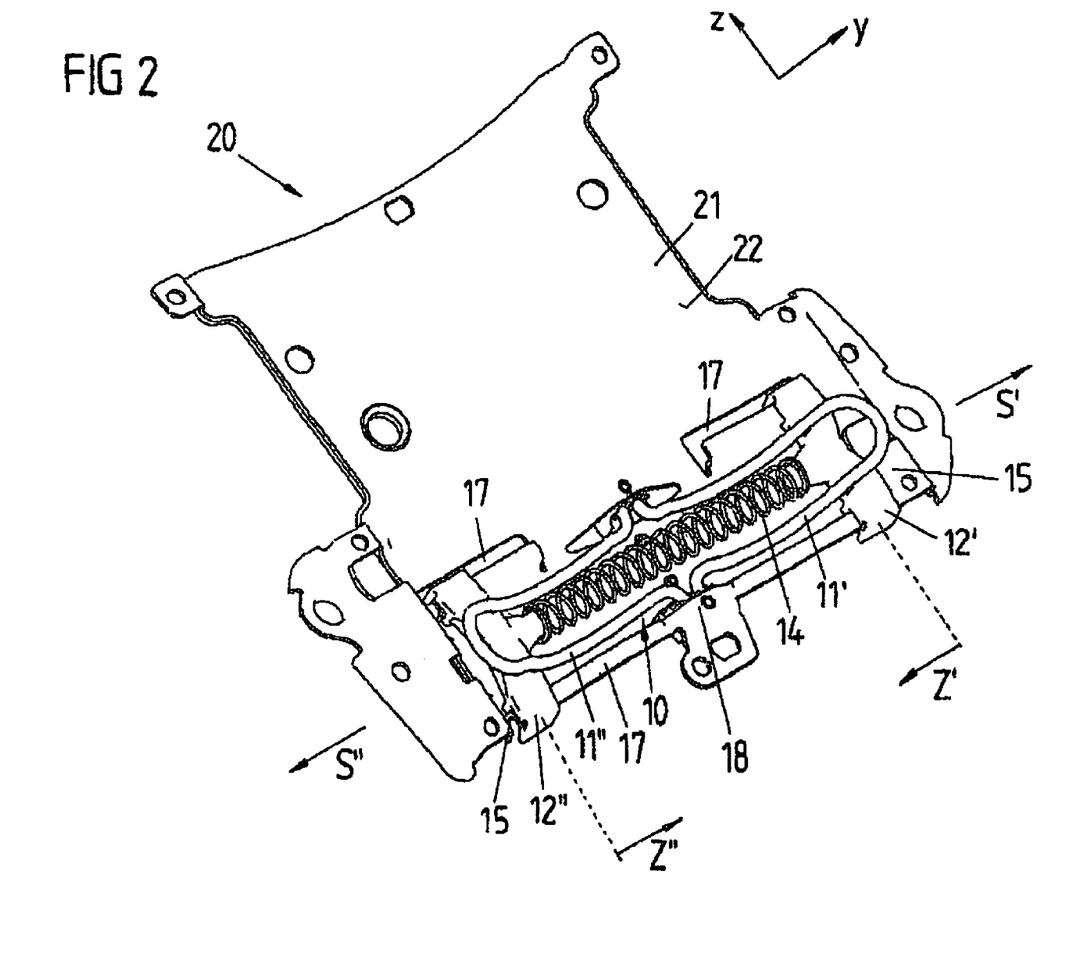
FIG. 2 shows the support of FIG. 1 in a schematic illustration.
Figure 3:
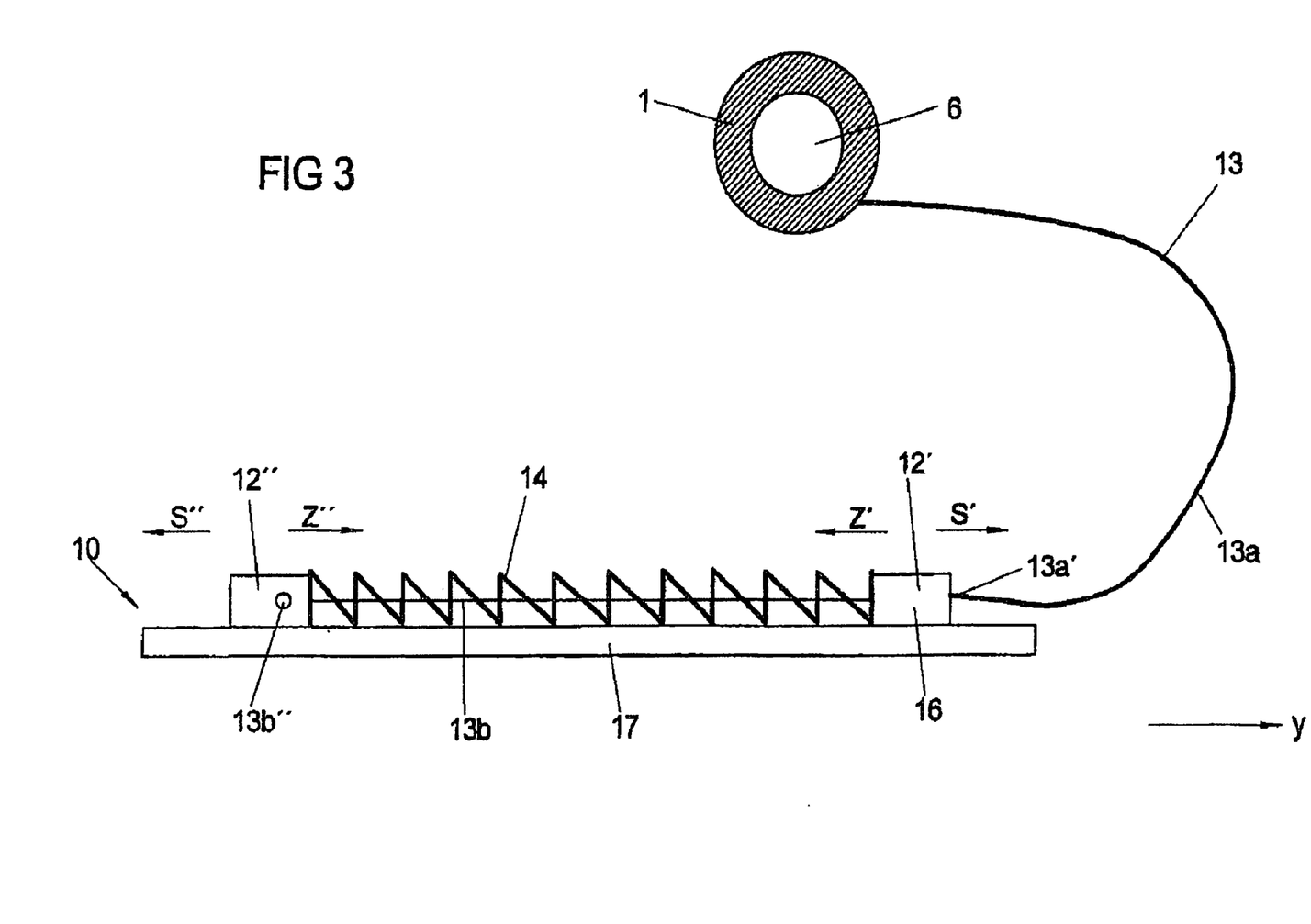
FIG. 3 shows a schematic illustration of the coupling of the lumbar adjuster device of the support from FIG. 1 to a manual adjustment means.

FIGS. 1 and 2 show a support 20 which has a support plate 21 and a lumbar adjuster device 10 arranged thereon. The support plate 21 is fastened by means of suitable fixing means to the struts 31 extending in the longitudinal direction z of the backrest. In this case, the support plate 21 extends from one strut 31 to the other strut 31 along a plane of extent of the backrest frame and along the horizontal transverse direction y (perpendicular to the longitudinal direction z of the backrest). The lumbar adjuster device 10 has a rotary bearing 18, in which two supporting bows 11', 11" are coupled pivotably, approximately centrally with respect to the transverse extent in the transverse direction y.

Each of the two supporting bows 11', 11" extends in each case from both of its ends, which are coupled pivotably to the rotary bearing 18, to one of the two lateral edges of the support plate 21. The U-shaped supporting bows 11', 11" have a curvature such that they each define a ramp with a variable curvature which interacts with a respectively associated slide 12', 12".

The two slides 12', 12" are each guided on a slide guide 17, which is arranged or formed on the support plate 21, in the direction of extent of the limbs of the U-shaped supporting bows 11', 11". They engage here on the curved sections of the two supporting bows 11', 11" and interact therewith in the manner of a ramp in accordance with the wedge principle. The two slides 12', 12" can be moved along the respectively assigned slide guide 17 in opposite directions to each other along the horizontal transverse direction y by means of a manual drive (not illustrated). By displacement of the slides 12', 12" along the direction y parallel to the plane of extent of the backrest frame 30, a setting of the position or curvature of the lumbar support 32 along a direction x perpendicular to the plane of extent (yz plane) of the backrest frame 30 can be undertaken by means of the supporting bows 11', 11".

This is to be attributed to the fact that the slides 12', 12" interact with correspondingly curved sections of the supporting bows 11', 11" in accordance with the wedge principle such that a movement of the slides 12', 12" along the direction y is converted into a movement of the supporting bows 11 (namely in a pivoting movement about the rotary bearings 18 of the supporting bows 11), which movement has a component in the x direction perpendicular to the plane of extent of the backrest frame 30.

The symmetrical arrangement of the two supporting bows 11', 11" and of the associated slides 12', 12" with respect to an axis of symmetry running in the longitudinal direction z of the backrest ensures a symmetrical, uniform curvature or adjustment of the lumbar support 32. The supporting bows 11', 11" therefore serve as adjuster elements for adjusting the position of the lumbar support.

The two slides 12', 12" are pretensioned by a tensioning element 14. In the exemplary embodiment, the tensioning element 14 is designed as a spiral spring which extends along the transverse direction y of the backrest and pretensions the two slides 12' and 12" along this direction toward the struts 31 (tensioning directions S' and S"). The tensioning element 14 brings about a pretensioning of the two slides 12', 12" in mutually opposite directions, the tensioning directions S' and S".

The pretensioning brings about a shearing force acting on the slides 12' and 12".

Slide stops 15 which outwardly restrict the slide guide 17 and prevent the slides 12' and 12" from being moved beyond the slide stop 15 are provided on the side edge of the support plate 21.

The slides 12' and 12", the slide guide 17, the slide stops 15, the tensioning element 14 and the rotary bearing 18 together form the lumbar adjuster device 10 which is arranged on the front side 22 of the support plate 21 and which, in an installed position, faces a user's back.

A movement of the slide 12' counter to its pretensioning direction S' is possible only counter to the pretensioning which is exerted on the slide 12' by the tensioning element 14 (the same applies to slide 12").

FIG. 3 schematically illustrates how the slides 12' and 12" of the lumbar adjuster device 10 of FIG. 2 are adjusted and moved. A cable 13b of a Bowden cable 13 runs through the longitudinal axis of the tensioning element 14 parallel to the transverse direction y of the backrest and parallel to the plane of the backrest frame.

The Bowden cable 13 serves as a drawing means for transmitting a drawing force which is transmitted to the slides 12' and 12" from a manual adjustment means 1 via the Bowden cable 13. In this case, the Bowden cable 13 has a casing tube 13a which is supported on the slide 12' and ends there. The cable 13b of the Bowden cable 13 is of longer design than the casing tube 13a and runs in the interior of the casing tube 13a. At the slide end 13a' of the casing tube 13a, the cable 13b protrudes from the casing tube 13a and is arranged in such a manner that it penetrates the slide 12' and extends along the tensioning element 14 as far as the second slide 12'. The cable 13b is fastened at its slide end 13b" to the second slide 12".

The slide end 13b" of the cable 13b can be moved relative to the slide end 13a' of the casing tube 13a by rotation of the manual adjustment means 1. The position of the manual adjustment means 1 determines the length of the cable 13b that protrudes beyond the slide end 13a' of the casing tube 13a and therefore the distance between the two slides 12' and 12".

By shortening the distance of the slide ends 13a' and 13b" from each other, which takes place by rotation of a cable pulley 6 of the manual adjustment means 1 in the driving direction, a drawing force is exerted on the slide 12" in a drawing direction Z" which runs in the opposite direction to the tensioning direction S" of the slide 12" and acts counter to the tensioning of the tensioning element 14. At the same time, the slide end 13a' of the casing tube 13a is pressed against the slide 12' counter to the tensioning direction S' and moves the slide 12' in the drawing direction Z' to the slide 12". By a drawing force, which is transmitted via the Bowden cable 13, being exerted on the slides 12' and 12", the latter are moved toward each other in the drawing direction Z' and Z". At the same time, they are guided by the slide guide 17.

The slide 12' therefore serves as a supporting element 16 for the slide end 13a' of the casing tube 13a.

The movement of the slides 12' and 12" toward each other takes place by transmission of a drawing force via the Bowden cable 13; a movement of the slides away from each other takes place with the aid of the tensioning force of the tensioning element 14. The slides can therefore be moved in relation to each other with the aid of a single drawing means 13.

In a further embodiment according to the invention, which is not illustrated in the figures, it is also possible for just one slide which moves along the longitudinal axis z of the backrest to be provided. It is pretensioned against a supporting element by a tensioning element. The adjustment principle functions analogously to FIG. 3 with the difference that the slide 12' is not movable but rather is fixed at its position as a supporting element 16. In this case, only one supporting bow (11') is also provided as the adjuster element for the lumbar support. As an alternative, two slides can be provided which run parallel to each other along the longitudinal direction z of the backrest and by means of the movement thereof the position of a respective adjuster bow is adjusted.

Figure 4:
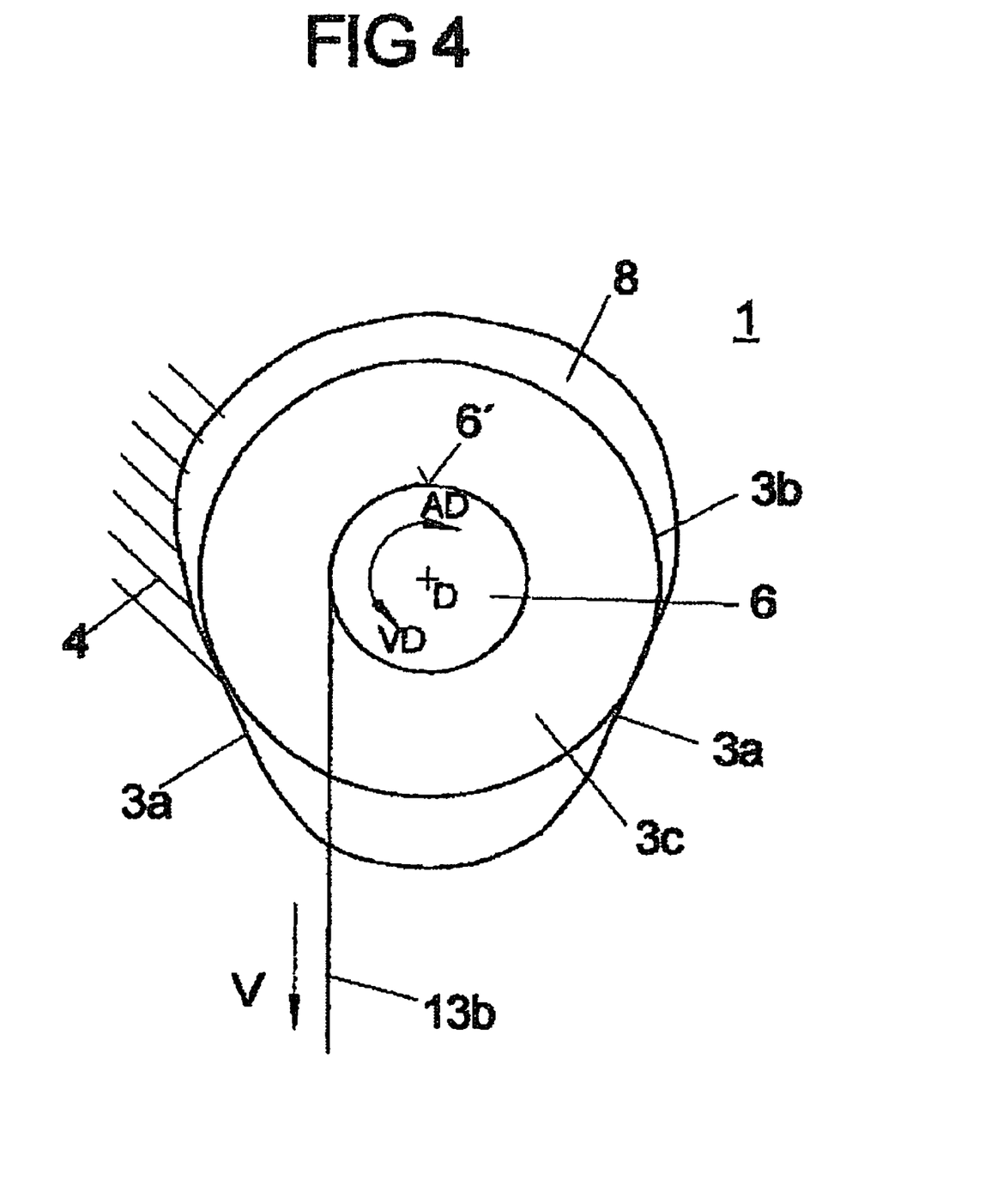
FIG. 4 shows a manual adjustment means for the lumbar adjuster device of FIG. 1 in a schematic illustration with a rounded braking contour.

FIG. 4 shows a schematic illustration of a manual adjustment means 1. It serves to transmit a drawing force to the slide 12' or 12" (cf. FIG. 3) via a drawing means 13 (FIG. 4 shows the cable 13b of the Bowden cable 12).

The core of the manual adjustment means 1 is a cable pulley 6 which is mounted rotatably about an axis of rotation D. FIG. 4 shows a section through the cable pulley 6 perpendicular to the axis of rotation D. A rolling-up surface 6' runs on an outer surface of the cable pulley 6, which outer surface bounds the cable pulley 6 in a circular manner. The rolling-up surface 6' serves for receiving and for rolling up the cable 13b of the drawing means 13 from FIG. 3. The cable 13b is fastened at the end which lies opposite the slide end 13b" (cf. FIG. 3) to the cable pulley 6. During rotation of the cable pulley 6, the cable 13b is rolled up onto the rolling-up surface 6' or is unrolled therefrom, depending in each case on the direction of rotation. The position of the angle of rotation of the cable pulley 6 sets how much of the cable 13b is rolled up on the cable pulley 6 and how much is unrolled therefrom.

The cable pulley 6 has a brake disk 3c which is likewise mounted rotatably about the axis of rotation D. The brake disk 3c and the cable pulley 6 are connected to each other in a torsionally rigid manner and cannot be rotated relative to each other. They may either comprise a single piece or be of two-piece design. Like the brake disk 3c, the cable pulley 6 may be designed in the shape of a disk.

The brake disk 3c has an outer surface 3b which faces away from the axis of rotation D, encircles the axis of rotation D and, in a blocking position of the manual adjustment means 1, is in frictional contact with a braking surface 3a. Accordingly, the brake disk 3c and the outer surfaces 3a, 3b function as a catch, which in the blocking position prevents the slide from being moved in the tensioning direction by the pretensioning of the slide. In the exemplary embodiment of FIG. 4, two braking surfaces 3a which run in a wedge-shaped manner with respect to each other are provided. The imaginary section of the two braking surfaces 3a runs parallel to the axis of rotation D and lies opposite the axis of rotation D along the course of the cable 13b.

The braking surfaces 3a are provided on an inside of a housing 4 of the manual adjustment means 1, which inside faces the cable pulley 6 transversely with respect to the axis of rotation D, and delimit a housing cutout 8 of the housing 4, in which the cable pulley 6 is arranged. In the blocking position of the manual adjustment means 1 according to FIG. 4, the brake disk 3c is pressed with its outer surface 3b against the two braking surfaces 3a and is wedged between them.

The cable 13b leads away from the cable pulley 6 along a course direction V and—as shown in FIG. 3—is fastened to the slide 12" on which a pretensioning which is produced by the tensioning element 14 acts in the direction S". The tensioning force resulting from the spring force of the tensioning element 14 is transmitted by the slide 12" via the cable 13b to the cable pulley 6 of the manual adjustment means 1 of FIG. 4. The pretensioning therefore brings about a force on the cable pulley 6 in the direction of the course direction V of the cable 13b. By the rolling-up surface 6' being spaced apart from the axis of rotation D, the pretensioning brings about a torque on the cable pulley 6 about the axis of rotation D in the output direction VD.

A shortening of that part of the cable 13b which is unrolled from the cable pulley 6 can be achieved by rotating the cable pulley 6 in the driving direction while the pretensioning ensures that, upon rotation in the output direction, the cable 13b is unwound from the cable pulley. By this means, an adjustment of the slide position on the slide guide 17 (cf. FIG. 1) is possible by means of a single, thread-less cable pulley. Upon rotation of the cable pulley 6, either the frictional force between the outer surface 3b and the braking surfaces 3a is overcome by application of a rotational force of the cable pulley 6 is moved by a short amount counter to the course direction V such that the outer surface 3b is no longer in contact, i.e. in engagement, with the braking surface 3a.

Figure 5A:
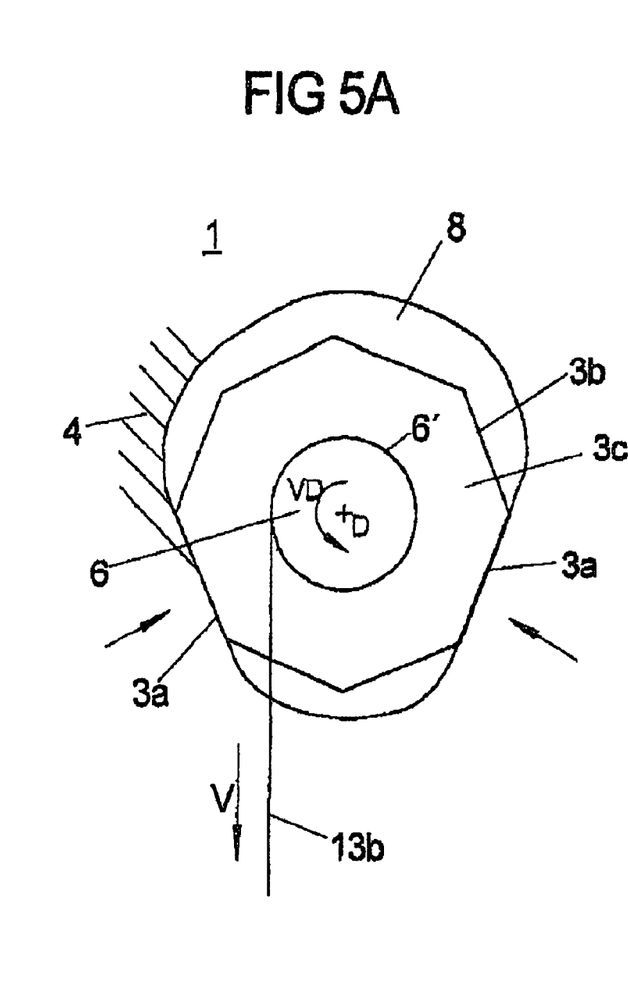
FIG. 5A shows a schematic illustration of a manual adjustment means for a lumbar support with a polygonal braking structure under pretensioning.
Figure 5B:
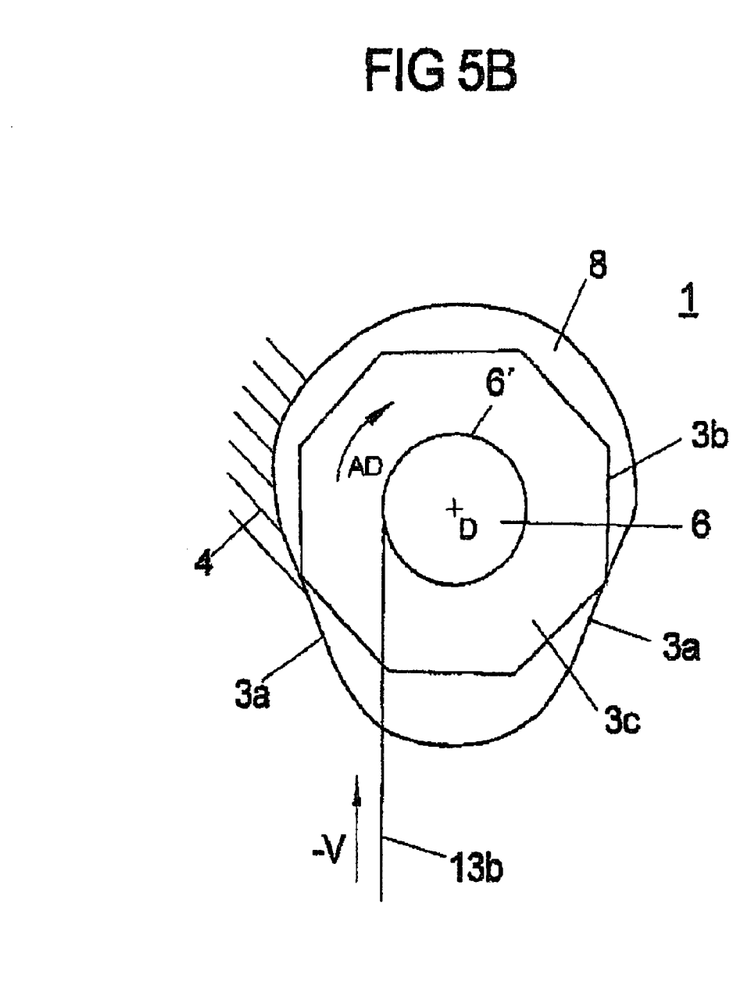
FIG. 5B shows the manual adjustment means of FIG. 5A during rotation in the driving direction.

FIGS. 5A and 5B show a variant embodiment for the manual adjustment means 1 of FIG. 4. Whereas, in FIG. 4, the cross-sectional contour (the corresponding cross-sectional plane runs perpendicular to the axis of rotation D) of the outer surface 3b of the brake disk 3c is of smooth design, the contour of the outer surface 3b of FIG. 5 is of polygonal design and has a plurality of corners along the circumference of the brake disk 3c. The contour (braking contour) of the outer surface 3b runs rectilinearly between the corners.

In the blocking position shown in FIG. 5A, two sheet-like regions of the outer surface 3b bear against the braking surfaces 3a. For rotation of the cable pulley 6, now not only does the frictional force have to be overcome but also the cable pulley 6 has to be moved relative to the housing 4. Although a drawing force acts on the cable pulley 6 along the course direction V via the cable 13b, the cable pulley does not rotate but rather remains in its blocking position.

In FIG. 5B, the cable pulley 6 is rotated in the driving direction AD, and therefore a drawing force is transmitted to the cable 13b in a negative course direction V. The number of polygon corners of the braking contour 3b defines the number of different blocking positions. The lumbar support can be adjusted in a greater number of steps the more polygon corners the brake disk 3c has. The circular design of the brake disk 3c in the exemplary embodiment of FIG. 4 results in a stepless adjustment.

Figure 6:
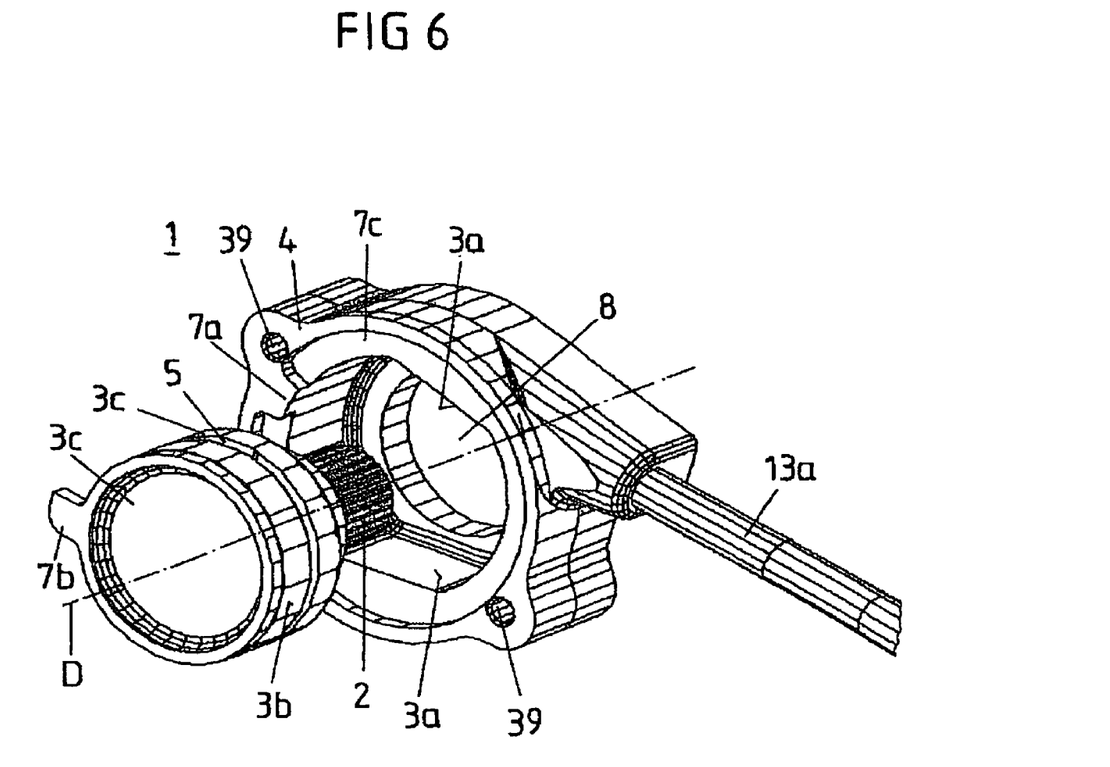
FIG. 6 shows a perspective view of a manual adjustment means for a lumbar support with a hand wheel.

FIG. 6 shows a further exemplary embodiment of a manual adjustment means 1 according to the invention in an exploded illustration. The outer surface 3b is again of polygonal design in cross section (braking contour). In addition to the brake disks 3c, a hand wheel 2 is also fastened to the cable pulley 6 in a torsionally rigid manner relative to the cable pulley 6. In order to adjust the lumbar support, said hand wheel can be actuated by a seat user by being rotated about the axis of rotation D.

A cable groove 5 is formed between the brake disks 3c and serves for receiving the cable of a Bowden cable, the casing tube 13a of which is supported against the housing 4 of the manual adjustment means 1. The cable 13b of the Bowden cable 13 is wound up onto the rolling-up surface 6' of the cable pulley 6 (not visible in FIG. 6) in the cable groove 5. Upon rotation of the cable pulley 6 in the driving direction AD and therefore upon winding up of the cable 13b a drawing force is provided which always acts in the same direction along the cable 13b.

A stop 7b which is guided along a guide 7c during rotation is formed on one of the brake disks 3c. The guide 7c is designed as a cutout in the housing 4 and is interrupted by a counter stop 7a which serves to restrict the angle of rotation about which the cable pulley 6 can be rotated. In this case, the stop 7b serves both to restrict the adjustment travel during rotation of the cable pulley 6 in the driving direction AD and also during rotation of the cable pulley 6 in the output direction VD. In this case, the maximum adjustment travel is approximately 360°.

In order to fix the housing 4 on a support of the manual adjustment means 1, two passage openings 39 are provided on the housing 4, the passage openings running along the axis of rotation D and lying opposite each other transversely with respect to the axis of rotation D. Screws or similar fastening means can be introduced into said passage openings 39 and can be fixed on the support of the manual adjustment means 1.

Figure 8:
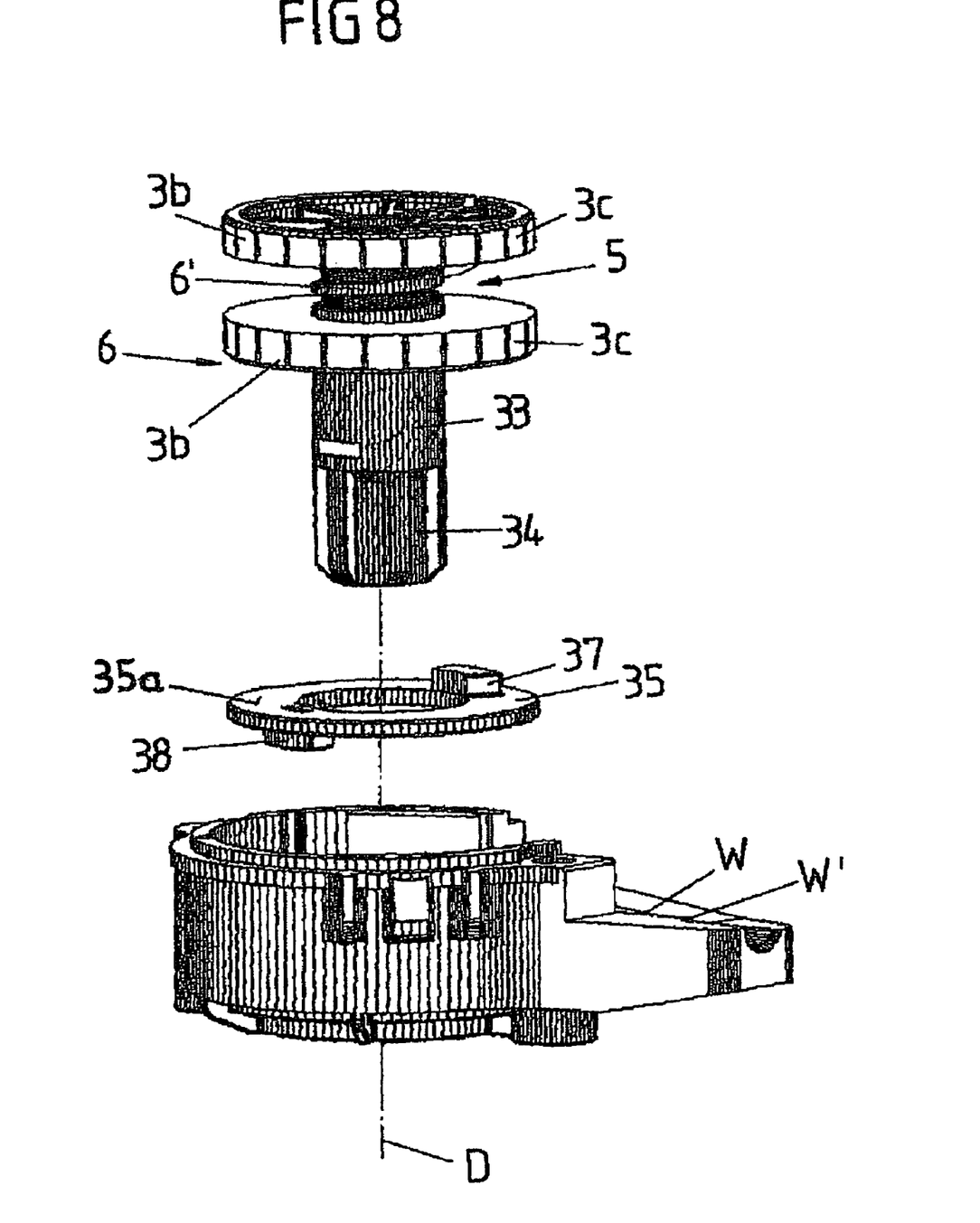
FIG. 8 shows a perspective exploded view of a modification of the manual adjustment means shown in FIG. 6, in which a stop of a cable pulley interacts with a counter stop of the housing of the manual adjustment means via a rotably mounted coupling member in order to restrict the adjustment travel of the cable pulley.
Figure 9:
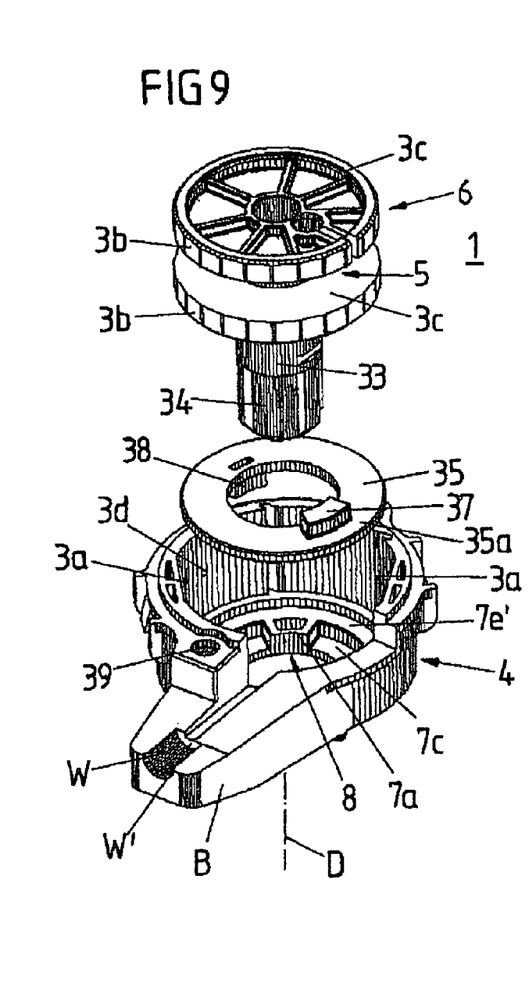
FIG. 9 shows a further perspective exploded view of the manual adjustment means shown in FIG. 8.
Figure 10:
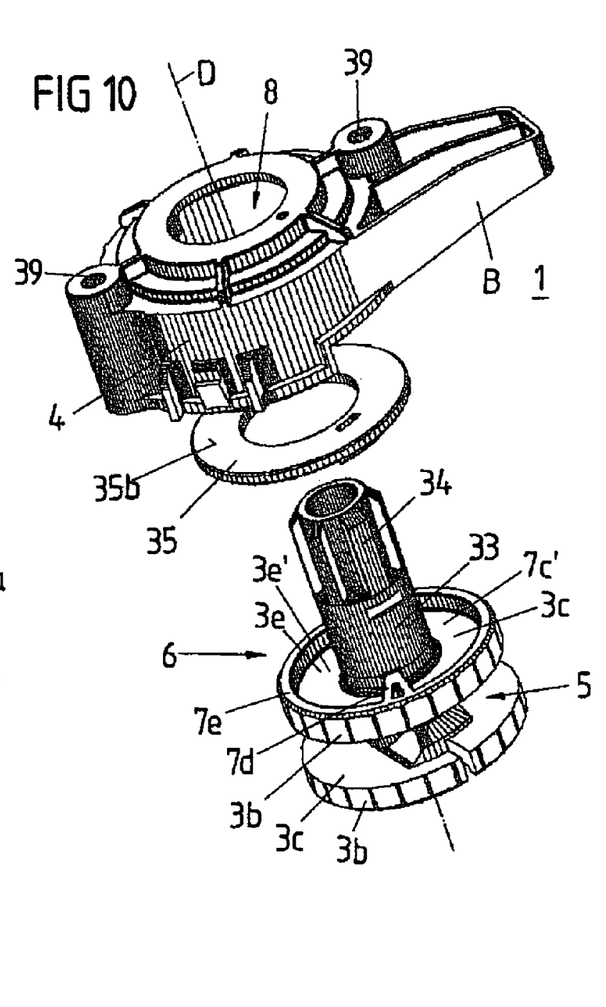
FIG. 10 shows a further perspective exploded view of the manual adjustment means illustrated in FIGS. 7 and 8.

FIG. 8 shows, in conjunction with FIGS. 9 and 10, an exploded view of a modification of the manual adjustment means 1 shown in FIG. 6. In order to adjust a motor vehicle part, in particular a lumbar support of a motor vehicle seat, a cable pulley 6 which is mounted in a housing 4 in a manner such that it can rotate about an axis of rotation D is provided. According to FIGS. 3, 4, 5A and 5B, a drawing means in the form of a cable 13 of a Bowden cable can be rolled up onto the cable pulley 6, said drawing means serving for coupling the manual adjustment means 1 to an adjuster device, in particular a lumbar adjuster device 10 (cf. FIGS. 1 to 3). In this case, a free end section of the casing tube 13a which surrounds the cable 13b is fixed in a cutout W of a region B of the housing 4, which region protrudes from the housing 4, and therefore a free end of the casing tube 13b can be supported on an abutment W' which is formed by a step-like contraction of the cutout W, along which contraction the cable 13b, which protrudes out of the casing tube 13a, of the Bowden cable is guided into the housing 4 where it is partially rolled up on a rolling-up surface 6' (cf. FIGS. 4, 5A and 5B) and is fastened to the cable pulley 6 via a free end region of that part of the cable 13b which is rolled up onto the rolling-up surface 6'. For this purpose, this free end region can be, for example, widened and can engage in a cutout formed on the cable pulley 6 such that the cable pulley 6 can absorb a drawing force acting on the cable 13b.

The cable pulley 6 comprises a shaft 33 extending along the axis of rotation D, and also, according to FIG. 6, two brake disks 3c which encircle the shaft 33, protrude from the shaft 33 at a distance from each other along the axis of rotation D on both sides of the rolling-up surface 6' encircling the shaft 33 (cf. FIGS. 4, 5A and 5B) and, in the process, form the cable groove 5 which encircles between the two brake disks 3c (cf. FIG. 6) and serves for receiving that part of the cable 13b which is rolled up onto the cable pulley 6.

The cable pulley 6 is introduced along the axis of rotation D with a free end region 34 of the shaft 33 in front into a continuous housing cutout 8 of the housing 4, which cutout is aligned with the axis of rotation D, in such a manner that the free end region 34 of the shaft 33 is led out of the housing 4 along the axis of rotation D, and the cable pulley 6, to be precise the two brake disks 3c extending perpendicularly to the shaft 33, together with the cable groove 5 are surrounded in cross section by the housing 4. In this case, the outsides 3b of the brake disks 3c according to FIG. 6 face an inside 3d of the housing 4, which inside faces the cable pulley 6, and, according to FIG. 6, have a circular, polygonal contour in a cross-sectional plane running transversely with respect to the axis of rotation D. Put in another way, the outer surfaces 3b of the two brake disks 3c are composed of planar surface segments which each form an edge with an adjacent surface segment, i.e. are angled with respect to one another.

The outer surfaces 3b are thereby designed, according to FIGS. 5A and 5B, to be in engagement in a blocking position of the cable pulley 6 with braking surfaces 3a which are angled with respect to each other in a wedge-shaped manner and are provided on the inside 3d of the housing 4.

In order to actuate the manual adjustment means 1, to be precise by rotation of the cable pulley, a hand wheel (not shown in FIGS. 8 to 10) can be pushed onto the free end region 34 of the shaft 33. So that the hand wheel can be connected easily to the shaft 33 in a rotationally fixed manner, recesses which extend along the axis of rotation D and in which interlocking regions of the hand wheel can engage in order to fix the hand wheel in a rotationally fixed manner on the shaft 33 are formed on the free end region 34 of the shaft 33.

If the cable pulley 6 is moved out of the blocking position by appropriate actuation of the hand wheel 2 (not shown in FIGS. 8 to 10), the cable pulley 6 can be rotated to and fro between a first end position and a second end position in a driving direction AD and an output direction VD in the opposite direction to the driving direction AD (cf. FIGS. 4, 5A and 5B) in order to adjust the lumbar adjuster device 10 or the lumbar support 32 according to FIGS. 1 to 3.

In order to restrict the adjustment travel running from the first end position to the second end position, the cable pulley 6 has a stop 7d which protrudes from the cable pulley 6 along the axis of rotation D and is formed on an inside 3e, which faces the housing 4, of the brake disk 3c which is at a smaller distance from the free end region 34 of the shaft 33 along the axis of rotation D. This brake disk 3c is also referred to below as the inner brake disk 3c.

The stop 7d is provided in order, during rotation of the cable pulley 6 along the driving direction AD or output direction VD, to strike against a first stop region 37 of a coupling member 35 via which the stop 7d can interact with a counter stop 7a on the housing in order to restrict the adjustment travel of the cable pulley 6.

The coupling member 35 engages annularly around the free end region 34 of the shaft 33 transversely with respect to the axis of rotation D and has a first side 35a facing the stop 7d and a second side 35b facing away from the stop 7d, the first stop region 37 protruding from the first side 35a of the coupling member 35 along the axis of rotation D, to be precise in the opposite direction to the stop 7d, and therefore the latter, during rotation of the cable pulley along the driving direction AD or along the output direction VD, can strike against the first stop region 37. Depending on the position of the stop 7d with respect to the first stop region 37, the cable pulley 6 can be rotated at maximum through an angle of rotation of 360° before the stop 7d enters into engagement with the first stop region 37. After the stop 7d strikes against the first stop region 37, the cable pulley 6 carries along the coupling member 35 upon further rotation (in the same direction) of the cable pulley 6. In this case, the coupling member 35—for the purpose of its rotatable mounting in the housing 4—bears with its first side 35a against a first sliding surface 7e provided on the inside 3e of the inner braking wheel 3c, and with its second side 35b against an annular, second sliding surface 7e' formed on the housing 4.

In order to restrict the common rotation of the coupling member 35 and of the cable pulley 6, a second stop region 38 is provided on the second side 35b of the coupling member 35, which side faces away from the first side 35a, said second stop region protruding from the second side 35b of the coupling member 35 along the axis of rotation D and being provided for striking against the counter stop 7a of the housing 4. Since the coupling member 35 can likewise be rotated through at maximum approximately 360° (with respect to the housing 4) before the second stop region 38 strikes against the counter stop 7a, overall a maximum adjustment travel of the cable pulley along or counter to the driving direction AD of around 720° results from the use of the rotatable coupling member 35. So that the first and the second stop regions 37, 38 of the coupling member 35 can be guided in a defined manner along the adjustment travel during the adjustment of the cable pulley 6, a guide 7c (interrupted by the counter stop 7a), along which the second stop region 38 can slide, is formed on the housing 4, and a cutout 3e', which faces the first stop region 37 along the axis of rotation D and annularly surrounds the axis of rotation D, is provided on the inner braking wheel 3c, in which cutout the first stop region 37 engages in such a manner that it is guided by the cutout 3e' during the adjustment of the cable pulley 6 or of the coupling member 35.

Of course, a plurality of such coupling members 35 may be used in order to extend the maximum angle of adjustment in each case by further (approximately) 360°.

Figure 11:
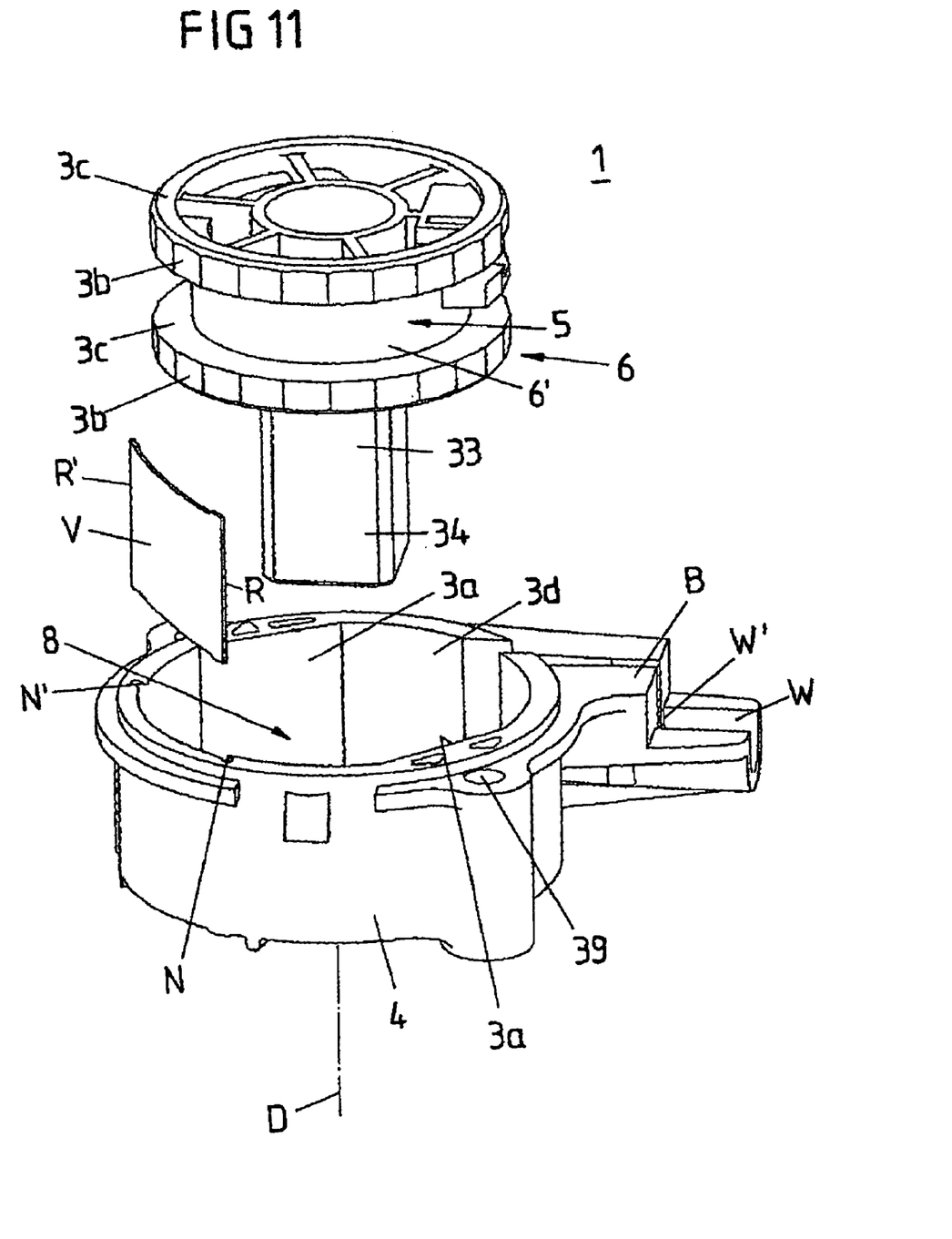
FIG. 11 shows a perspective exploded view of a variant of the manual adjustment means according to the invention, with an additional pretensioning element which is pretensioned against the cable pulley in such a manner that the latter cannot unintentionally pass out of a blocking position.
Figure 12:
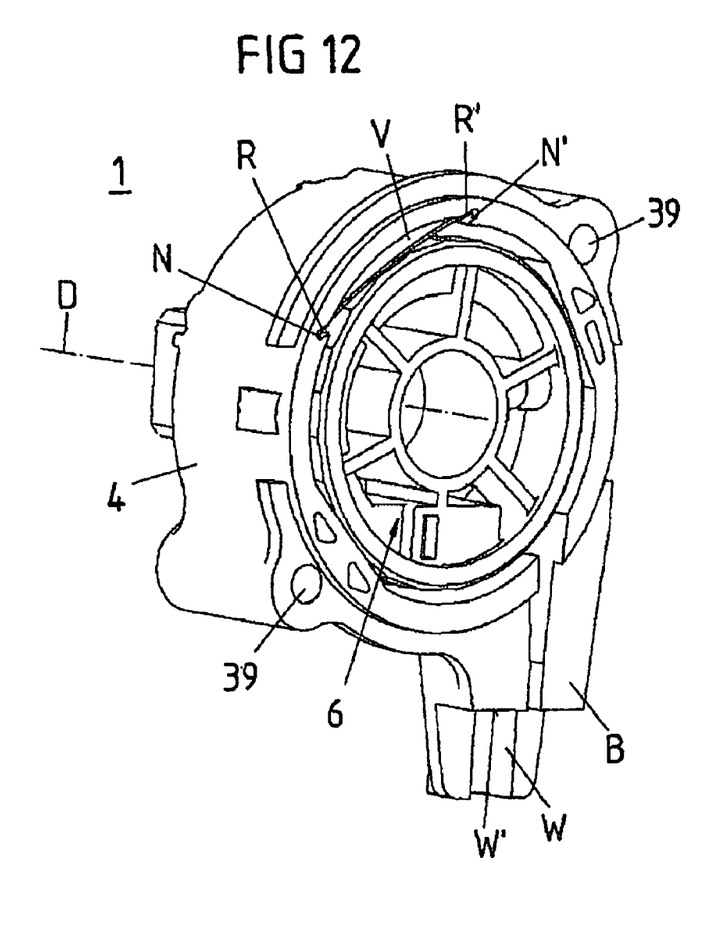
FIG. 12 shows a perspective view of the manual adjustment means shown in FIG. 11.
Figure 13:
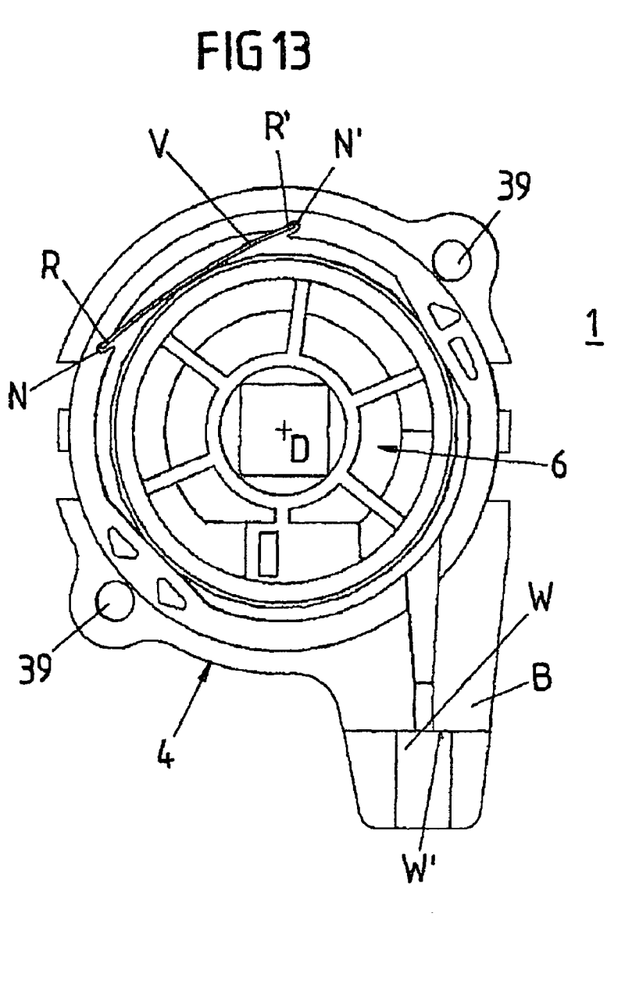
FIG. 13 shows a plan view of the manual adjustment means shown in FIGS. 11 and 12.

FIG. 11 shows, in conjunction with FIGS. 12 and 13, a modification of the type shown in FIG. 6 and FIGS. 8 to 10, in which, in contrast to FIG. 6 and FIGS. 8 to 10, an additional pretensioning element V of sheet like design is provided on the inside 3d of the housing 4.

The pretensioning element V is pretensioned against the cable pulley 6 and presses the latter against the two braking surfaces 3a, which run obliquely towards each other, and therefore the cable pulley 6 is wedged to the braking surfaces 3a (interlocking and friction connection) in an unactuated position, even when there is little pretensioning acting on the cable 13b along the course direction V. For this purpose, the pretensioning element V bears under pretensioning against the outer surfaces 3b of the brake disk 3c of the cable pulley 6, with the pretensioning element preferably being designed as a leaf spring.

In order to fix the pretensioning element V, grooves N, N' which extend along the axis of rotation D and lie opposite each other and the braking surfaces 3a transversely with respect to the axis of rotation D are formed on the inside 3d of the housing 4. The pretensioning element V is introduced along the axis of rotation D into said grooves N, N' by means of two edge regions R, R', which extend along the axis of rotation D, of the pretensioning element V, with the grooves N, N' each engaging around one of the two edge regions R, R' in cross section.

The invention claimed is:

1. A support for a motor vehicle seat provided in a backrest frame of a motor vehicle seat and arranged behind a lumbar support for supporting a seat user's back, the support comprising:
    a front side facing a seat user's back;
    a lumbar adjuster device arranged on the front side and configured to set the position of the lumbar support perpendicular to a plane defined by the backrest frame;
    wherein the lumbar adjuster device comprises:
        at least one adjuster element configured to operatively connect with the lumbar support; and
        at least one slide movable with respect to the adjuster element;
        wherein the adjuster element and the slide interact in such a manner that, upon movement of the slide, the adjuster element is adjusted along a direction with a directional component perpendicular to a direction of movement of the slide and the adjuster element acts in the directional component on the lumbar support;
    wherein the slide is movable, firstly, along a tensioning direction wherein the slide is pretensioned along the tensioning direction, and, secondly, along a drawing direction wherein a drawing force is transmittable to the slide along the drawing direction via a drawing device coupled to the slide; and
    wherein at least one slide stop located on a lateral edge of the support restricts movement of the slide.

2. The support of claim 1, wherein the slide moves in the tensioning direction if an amount of drawing force transmitted to the slide via the drawing device is smaller than a pretensioning of the slide.

3. The support of claim 1, wherein the slide is movable in the drawing direction by the drawing force transmitted to the slide via the drawing device.

4. The support of claim 3, wherein the slide moves in the drawing direction when an amount of drawing force transmitted to the slide via the drawing device is greater than a pretensioning of the slide.

5. The support of claim 1, wherein the tensioning direction and the drawing direction of the slide run in opposite directions to each other.

6. The support of claim 1, wherein two slides are pretensioned in opposite tensioning directions and are each movable relative to the adjuster element.

7. The support of claim 6, wherein the two slides are movable in opposite drawing directions by a drawing force transmitted to the slide via the drawing device.

8. The support of claim 6, wherein the two slides are coupled to each other via a tensioning element configured to pretension the slides.

9. The support of claim 6, wherein the drawing device is configured as a Bowden cable having a casing tube, wherein one of the two slides serves as a supporting element, wherein the casing tube of the Bowden cable is supported on the supporting element, and wherein the tensioning element acts on the supporting element.

10. The support of claim 1, wherein a transmission of a drawing force via the drawing device takes place with a manual adjustment device.

11. The support of claim 10, wherein the manual adjustment device has a hand wheel.

12. The support of claim 1, further comprising a catch, wherein in a blocking position, the catch prevents the slide from being moved in the tensioning direction by the pretensioning of the slide.

13. The support of claim 12, wherein with the catch released and without transmitting a drawing force to the slide via the drawing device, the slide is moved in the tensioning direction by the pretensioning.

14. The support of claim 1, wherein the pretensioning of the slide is provided by at least one of a spring and an elastic element.

15. The support of claim 1, wherein the drawing device is configured as a cable pull.

16. The support of claim 1, wherein the drawing device is configured as a Bowden cable, wherein a casing tube of the Bowden cable is supported on a supporting element, and wherein a tensioning element configured to pretension the slide acts on the supporting element.

17. The support of claim 1, wherein the slide is movable essentially parallel to the plane defined by the backrest frame.

18. The support of claim 1, wherein the slide is movable essentially rectilinearly.

19. The support of claim 1, wherein the slide is guided with a slide guide.

20. A support for a motor vehicle seat provided in a backrest frame of a motor vehicle seat and arranged behind a lumbar support for supporting a seat user's back, the support comprising:
    a front side facing a seat user's back;
    a lumbar adjuster device arranged on the front side and configured to set the position of the lumbar support perpendicular to a plane defined by the backrest frame;
    wherein the lumbar adjuster device comprises:
        at least one adjuster element configured to operatively connect with the lumbar support;
        at least one slide movable with respect to the adjuster element; and
        a catch;
        wherein the adjuster element and the slide interact in such a manner that, upon movement of the slide, the adjuster element is adjusted along a direction with a directional component perpendicular to a direction of movement of the slide and the adjuster element acts in the directional component on the lumbar support;
    wherein the slide is movable, firstly, along a tensioning direction wherein the slide is pretensioned along the tensioning direction, and, secondly, along a drawing direction wherein a drawing force is transmittable to the slide along the drawing direction via a drawing device coupled to the slide; and
    wherein in a blocking position, the catch prevents the slide from being moved in the tensioning direction by the pretensioning of the slide.

* * * * *